US007528998B2

(12) United States Patent
Yoshioka et al.

(10) Patent No.: US 7,528,998 B2
(45) Date of Patent: May 5, 2009

(54) DISCRIMINATION SENSOR AND DISCRIMINATION MACHINE

(75) Inventors: Kazuei Yoshioka, Tokyo (JP); Jun Fujimoto, Tokyo (JP)

(73) Assignees: Aruze Corp., Tokyo (JP); Seta Corp., Tokyo (JP)

( * ) Notice: Subject to any disclaimer, the term of this patent is extended or adjusted under 35 U.S.C. 154(b) by 1001 days.

(21) Appl. No.: 10/945,268

(22) Filed: Sep. 21, 2004

(65) Prior Publication Data

US 2005/0069190 A1 Mar. 31, 2005

(30) Foreign Application Priority Data

Sep. 26, 2003 (JP) ............................ 2003-334536

(51) Int. Cl.
*H04N 1/04* (2006.01)

(52) U.S. Cl. .................. 358/474; 358/518; 358/406.25; 358/513; 382/291; 382/318; 250/208.1

(58) Field of Classification Search ................. 358/474, 358/482, 483, 486, 488, 497, 408, 513–514, 358/509, 475, 54, 518, 426, 511; 356/71; 250/208.1; 382/291, 381
See application file for complete search history.

(56) References Cited

U.S. PATENT DOCUMENTS

| | | | | |
|---|---|---|---|---|
| 4,650,320 | A | 3/1987 | Chapman et al. | |
| 4,879,000 | A | 11/1989 | Gausa | |
| 4,973,851 | A * | 11/1990 | Lee | 250/556 |
| 5,278,669 | A * | 1/1994 | Takemoto | 358/453 |
| 5,304,813 | A | 4/1994 | De Man | |
| 5,682,103 | A * | 10/1997 | Burrell | 324/642 |
| 5,892,590 | A * | 4/1999 | Ida et al. | 358/406 |
| 6,178,015 | B1 * | 1/2001 | Lee et al. | 358/486 |
| 6,563,937 | B1 * | 5/2003 | Wendt | 382/100 |
| 6,621,928 | B1 * | 9/2003 | Inagaki et al. | 382/199 |
| 6,815,657 | B2 * | 11/2004 | Toyoshima et al. | 250/214 R |
| 7,103,206 | B2 * | 9/2006 | Graves et al. | 382/135 |
| 7,119,926 | B2 * | 10/2006 | Takeda et al. | 358/1.9 |
| 2004/0223147 | A1 | 11/2004 | Fujimoto et al. | |
| 2006/0163504 | A1 | 7/2006 | Fujimoto et al. | |

FOREIGN PATENT DOCUMENTS

| | | |
|---|---|---|
| EP | 1 056 056 | 11/2000 |
| EP | 1 276 079 | 1/2003 |
| JP | 06-333124 | 12/1994 |
| JP | 2003-77026 | 3/2003 |

* cited by examiner

*Primary Examiner*—Negussie Worku
(74) *Attorney, Agent, or Firm*—Leydig, Voit & Mayer, Ltd.

(57) ABSTRACT

A discrimination machine optically senses an object having a surface with a planar structure while scanning the planar structure along the surface. The machine includes a discrimination sensor including optical devices detecting light generated from the planar structure. The optical devices are disposed at an interval in a transverse direction, perpendicular to a scanning direction, to ensure a sufficiently wide sensing area for the object. A deviation detector detects deviation of the planar structure from a plane based on electrical signals output from the respective optical devices detecting the light generated by the object while the discrimination sensor is scanning the object. An optical device selector selects an optical device, from among the optical devices, based on the deviation detected. A determination is made as to whether the electrical signal output from the optical device selected is within an allowable margin.

9 Claims, 8 Drawing Sheets

DISCRIMINATION SENSOR AND DISCRIMINATION MACHINE

CROSS-REFERENCE TO THE RALATED APPLICATIONS

This application is based upon and claims a priority from a prior Japanese Patent Application No. 2003-334536, entire contents of which are incorporated herein by reference.

BACKGROUND OF THE INVENTION

1. Field of the Invention

The present invention relates to a discrimination sensor and a discrimination machine having a high accuracy and a high reliability to discriminate a specific object.

2. Description of the Related Art

Up until now, there have been proposed a wide variety of conventional discrimination sensor and conventional discrimination machine of this type one typical example of which is disclosed in the first patent document (Japanese Patent No. 2896288).

The conventional discrimination sensor disclosed in the first patent document is represented by reflection type to be disposed in face-to-face relationship with a distinctive characteristic segment of a planar structure (such as for example characters and figures printed on a bill) of a specific object (bill) when the specific object and the conventional discrimination sensor are relatively moved with respect to each other. In the above mentioned discrimination sensor of the reflection type, the data about the light reflected by the distinctive characteristic segment of the planar structure of the sample object (real bill) is previously stored as real samples. In the discrimination process, the determination is made on whether the specific object is real or fake by comparing the data (obtained by the characteristic segment when the bill is being moved with respect to the discrimination sensor) and previously stored data.

On the other hand, the conventional discrimination sensor of the transmission type is disclosed in the second patent document (Japanese Patent Laying-Open Publication No. 2003-77026).

In the above mentioned discrimination sensor of the transmission type, the data about the light transmitted through the distinctive characteristic segment of the planar structure of the sample object (real bill) is previously stored as a real sample. In the discrimination process, the determination is then made, in a way similar to the method identified in the first patent document, on whether the specific object is real or fake by comparing the data (obtained from the characteristic segment when the bill is being moved with respect to the discrimination sensor) and previously stored sample data.

In general, the above mentioned specific object, i.e., bills are mass-produced to have respective characteristic segments positioned with respective deviations which result in the printing precision and the mechanical accuracy of the printing machine. In the above mentioned conventional discrimination sensor, the data obtained from the displaced segments of the mass-produced bills are not always similar to one another by reason that each of the mass-produced bills is sensed in extremely narrow width by the conventional discrimination sensor.

In particular, the conventional discrimination sensor is disposed at a predetermined position. On the other hand, the conventional discrimination sensor is adapted to sense a segment of the specific object (bill) in a predetermined scanning direction under the condition that predetermined position of the conventional discrimination sensor is not adjusted on the basis of the deviation of the characteristic segment; This means that the data obtained from the sensed segment of the specific object (bill) is not always the same as the previously stored sample data under the condition that the characteristic segment is positioned with a deviation.

The conventional discrimination machine thus constructed as previously mentioned, however, encounters such a problem that the deviation may lead to the fact that the conventional discrimination sensor is operated to sense a segment (spaced apart from the characteristic segment) different from the characteristic segment by reason that the specific object (bill) is sensed in extremely narrow width under the condition that the characteristic segment is positioned with a deviation. This means that the real object (real bill) may be erroneously determined as a fake object (fake bill) by comparing the sample data and the data obtained from the segment different from the characteristic segment on the supposition that the characteristic segment is sensed by the conventional discrimination sensor. This leads to the fact that the accuracy and the reliability of the discrimination is deteriorated by the deviation of the characteristic segment.

SUMMARY OF THE INVENTION

It is, therefore, an object of the present invention to provide a discrimination sensor and a discrimination machine that can discriminate the specific object at a relatively high accuracy and at a markedly high reliability without being affected by the deviation of the planar structure.

According to a first aspect of the present invention, there is provided a discrimination sensor 2 available for optically sensing a specific object (for example a bill) 4 having a surface formed with a planar structure 6 to discriminate the specific object 4 while scanning the planar structure 6 along the surface of the specific object 4, comprising: a plurality of optical devices (for example E1, E2, E3) provided to be capable of receiving a light generated from the planar structure 6 of the specific object 4, the optical devices of the discrimination sensor being disposed at a predetermined interval in a transverse direction perpendicular to a scanning direction S2 in which the specific object 4 is scanned to ensure a sufficiently wide sensing area (sum of W1, W2, W3) for the specific object 4.

According to a second aspect of the present invention, there is provided a discrimination machine for optically sensing a specific object having a surface formed with a planar structure to discriminate the specific object while scanning the planar structure along the surface of the specific object, the discrimination machine comprises: a discrimination sensor including a plurality of optical devices provided to be capable of receiving a light generated from the planar structure of the specific object, the optical devices of the discrimination sensor being disposed at a predetermined interval in a transverse direction perpendicular to a scanning direction in which the specific object is scanned to ensure a sufficiently wide sensing area for the specific object.

The discrimination machine provided with the discrimination sensor further comprises: deviation detecting means 10 for detecting a deviation of the planar structure deviated to the surface of the specific object based on electrical signals outputted from the respective optical devices receiving the light generated from the planar structure of the specific object while the discrimination sensor is scanning the planar structure along the surface of the specific object; optical device selecting means 12 capable of selecting a specific optical device from among the optical devices based on the results of the deviation of the planar structure outputted by the deviation detecting means; and determining means 14 for determining whether or not the electric signal outputted from the specific optical device selected by the optical device selecting means is within a previously stored allowable margin.

In the discrimination sensor, each of the optical devices comprises a light emitting unit 8*a* for emitting a predetermined sensing light to the planar structure of the specific object, and a light receiving unit 8*b* for receiving the sensing light from the planar structure of the specific object when the sensing light is emitted by the light emitting unit. The optical devices are disposed in the transverse direction with no gap between the optical devices.

The light generated from the planar structure of the specific object includes a light "R" reflected on the planar structure of the specific object and a light "T" passed through the planar structure of the specific object. The planar structure of the specific object includes a printed pattern such as for example characters and figures printed on a surface of, for example, a bill.

BRIEF DESCRIPTION OF THE DRAWINGS

The features and advantages of a discrimination sensor and a discrimination machine according to the present invention will be more clearly understood from the following description taken in conjunction with the accompanying drawings in which:

FIG. 1(*b*) is a perspective view showing the state in which the discrimination sensor is scanning the planar structure along a surface of the specific object;

FIG. 1(*c*) is a schematic block diagram showing the construction of the optical device of the discrimination sensor;

FIG. 1(*d*) is a schematic block diagram showing the internal constriction of the discrimination machine;

FIG. 1(*e*) is a schematic plan view showing the state in which the discrimination sensor is scanning the specific object under the condition that the planar structure is positioned without a deviation;

FIG. 1(*f*) is a schematic plan view showing the state in which the discrimination sensor is scanning the specific object under the condition that the planar structure is positioned with a deviation;

FIG. 2(*b*) is a graph showing the allowable margin of the sample data obtained from the characteristic segment P2;

FIG. 2(*c*) is a graph showing the allowable margin of the sample data obtained from the characteristic segment P3;

FIG. 3(*b*) is an enlarged fragmental plan view showing one of the optical devises when the bill is optically scanned by the discrimination sensor;

FIG. 4(*b*) is a side view showing the construction of the discrimination sensor for discriminating whether the specific object is real or fake on the basis of the transmitted light of the specific object.

DESCRIPTION OF THE PREFERRED EMBODIMENTS

Figure 1A:
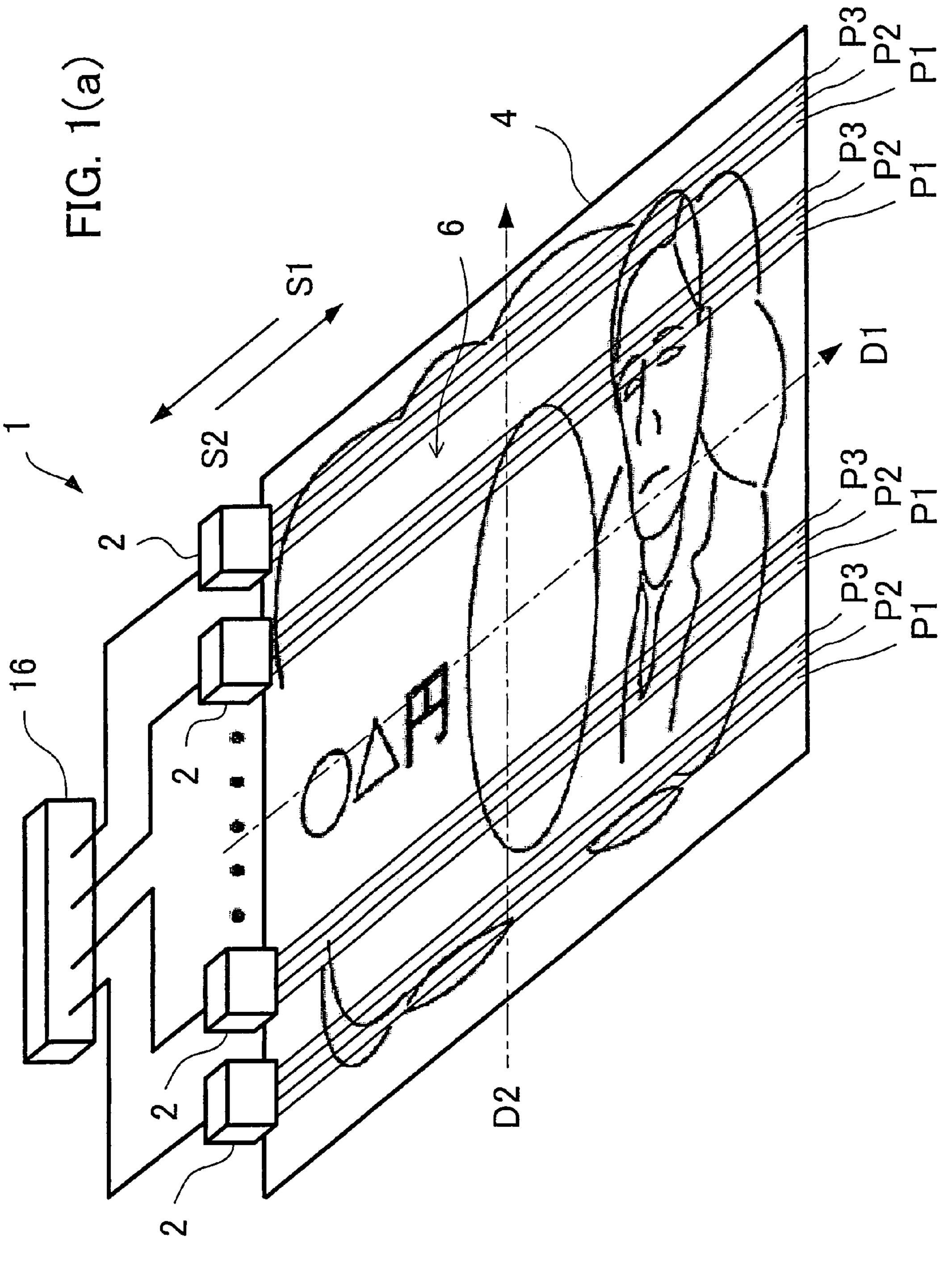
FIG. 1(*a*) is a perspective view showing the construction of the embodiment of the discrimination machine according to the present invention.
Figure 1B:
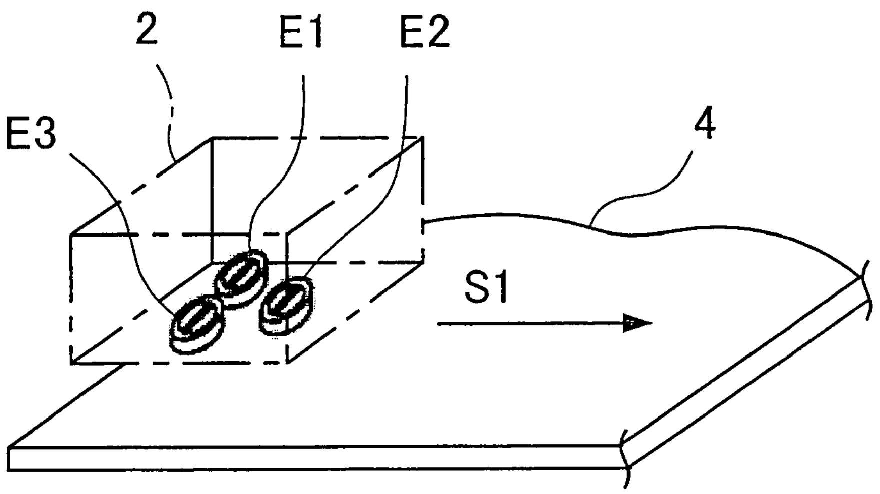
Figure 1C:
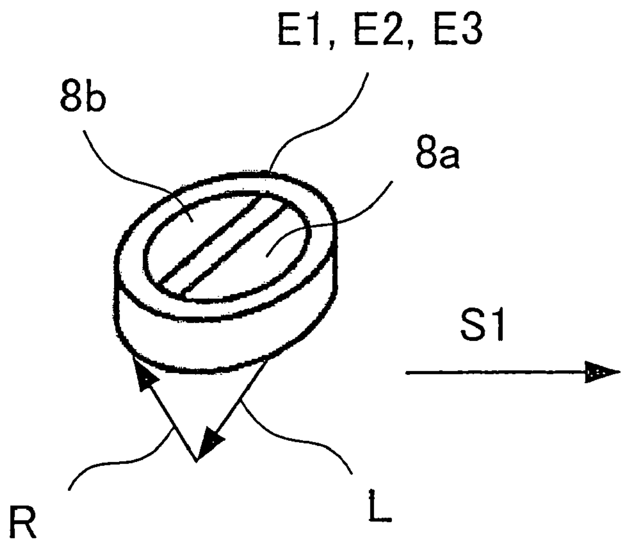
Figure 1D:
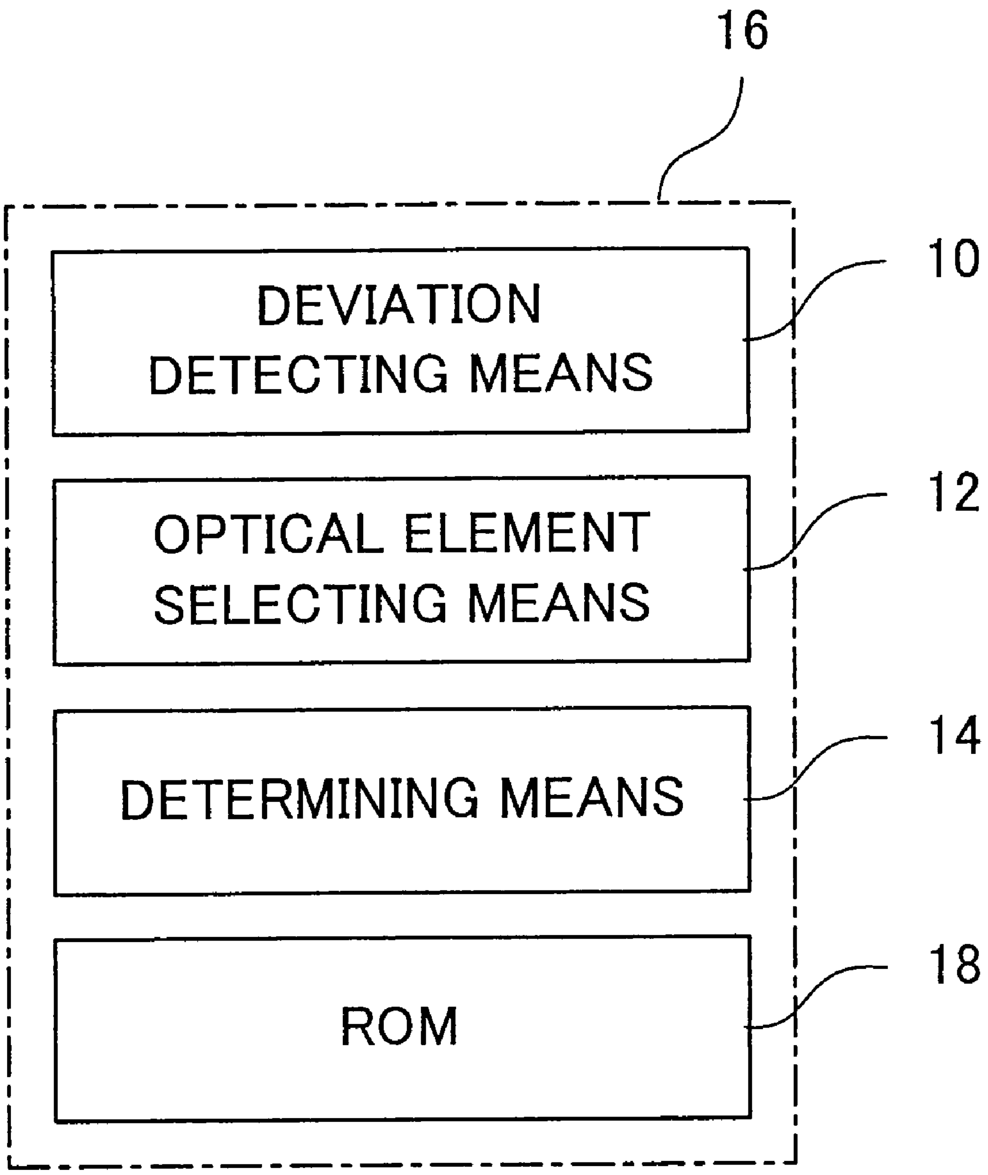
Figure 1E:
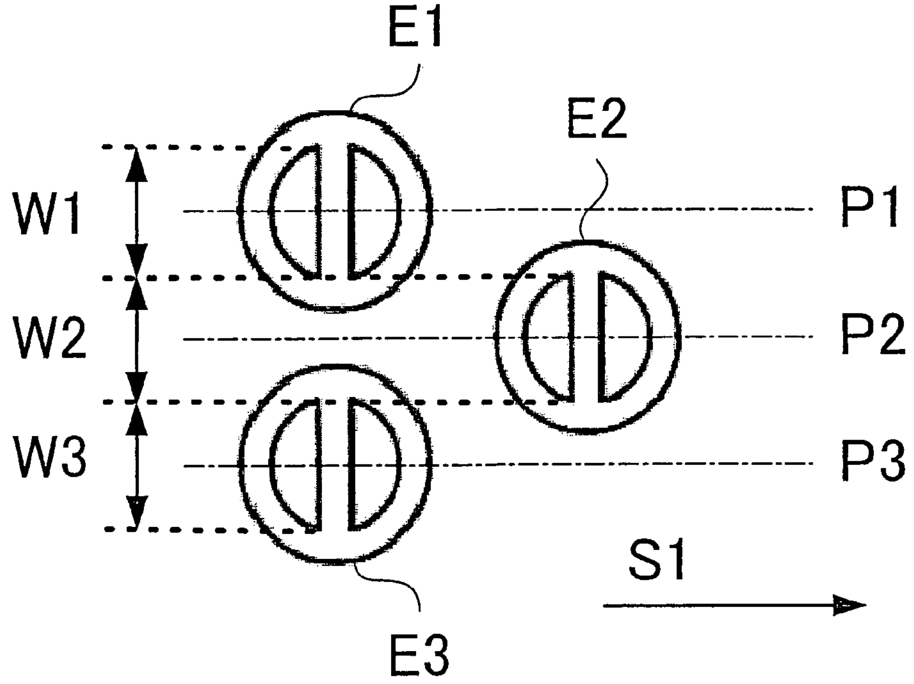
Figure 1F:
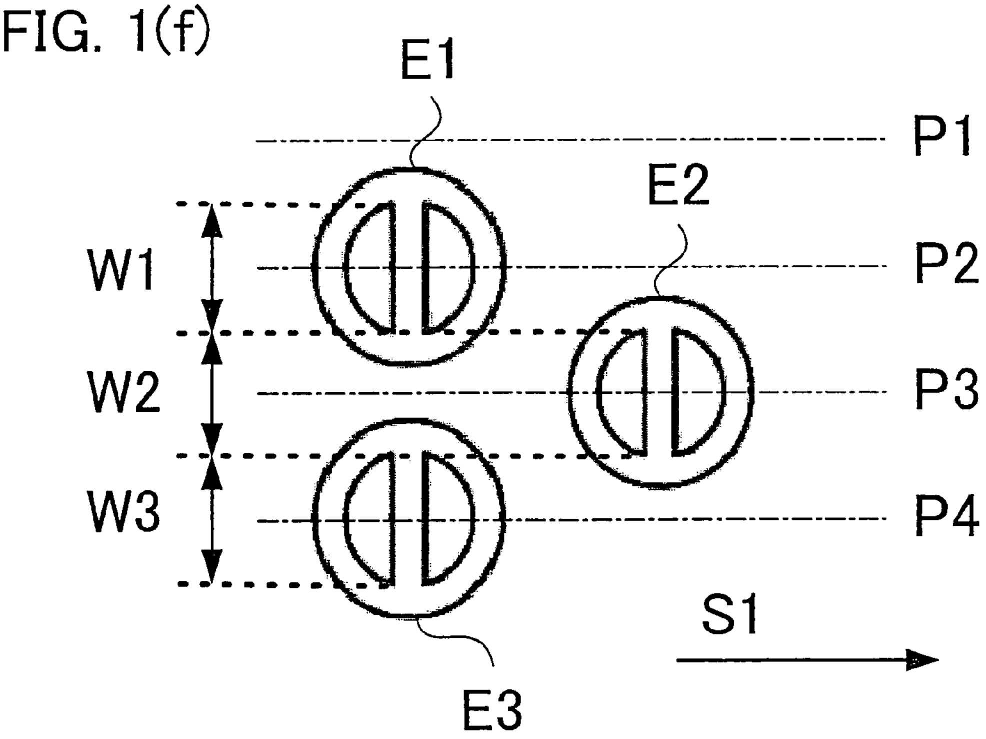

Referring now to FIGS. 1 to 4 of the drawings, there is shown one preferred embodiment of the discrimination sensor and the discrimination machine according the present invention.

FIG. 1(*a*) is a schematic perspective view showing the outline construction of the discrimination machine 1 provided with the discrimination sensor 2 according to the preferred embodiment of the present invention. The discrimination sensor 2 is designed to discriminate whether a specific object 4 is real or fake by optically sensing a planar structure 6 of the specific object 4 while scanning the planar structure 6 along a surface of the specific object 4.

Here, the specific object 4 is exemplified by a bill 4 in this embodiment. The term "planar structure" is intended to indicate a specific description such as for example characters, figures, and other patterns printed on the surface of the bill 4 in this embodiment.

As shown in FIG. 1(*a*), the discrimination sensors 2 are disposed with predetermined intervals in a transverse direction (lateral direction) D2 perpendicular to a longitudinal direction D1 of the bill 4 to sense (scan) respective scanned sections "A", i.e., characteristic portions forming part of the bill 4. However, the discrimination sensors 2 may be disposed with predetermined intervals in the longitudinal direction D1 of the bill 4 to sense the bill 4 in the transverse direction D2.

Here, the number and the predetermined intervals of the discrimination sensors 2 are configured on the basis of the number and the shape of the characteristic portions of the bill 4. The number and the predetermined intervals of the discrimination sensors 2, therefore, will not be described in detail in this embodiment. The term "characteristic portion" of the specific object exemplified-by the bill 4 is intended to indicate a portion which can be effectively determined and discriminated (for example, the portion which represents a most remarkable feature of the bill 4 in the planar structure 6).

When the bill 4 is scanned along its characteristic portion by the discrimination sensors 2, the discrimination sensors 2 are moved with respect to the bill 4 in a scanning direction S1 (an arrow shown in FIG. 1(*b*)) in this embodiment. The bill 4, however, may be moved with respect to the discrimination sensors 2 along the other scanning direction S2.

The discrimination machine 1 comprises driving device (not shown) for driving the discrimination sensors 2 to ensure that the bill 4 and the discrimination sensors 2 are relatively moved with respect to each other. The driving means may be replaced by a driving section of the conventional discrimination machine by reason that the constitution of the driving means of the discrimination machine is similar to that of the driving section of the conventional discrimination machine.

Additionally, the discrimination sensors 2 may be moved with respect to the bill 4 in synchronous relationship with one another. On the other hand, the discrimination sensors 2 may be separately driven by the discrimination machine 1 to be moved with respect to the bill 4 in asynchronous relationship with one another.

The discrimination sensor 2 is capable of receiving a light generated from the planar structure 6 of the bill 4 by optically sensing the scanned section "A" forming part of the bill 4. The scanned section "A" has a plurality of scanned segments P1, P2, and P3 divided in the transverse direction D2, and extending in the longitudinal direction.

The discrimination sensor 2 is shown in FIGS. 1(*a*) and 1(*b*) as including a plurality of optical devices (for example E1, E2, and E3) provided to be capable of receiving a light generated from the planar structure 6 of the bill 4. The optical devices E1, E2, and E3 are disposed with predetermined intervals in the transverse direction D2 perpendicular to the scanning direction S1 in which the bill 4 is scanned to ensure a sufficiently wide sensing area for the bill 4. In this embodiment, the discrimination sensor 2 includes three optical devices E1, E2, and E3, each of which is shown in FIG. 1(*c*) as having a light emitting unit 8*a* for emitting a predetermined sensing light "L" to the planar structure 6 of the bill 4, and a light receiving unit 8*b* for receiving the sensing light "R" from the planar structure 6 of the bill 4 when the sensing light "L" is emitted by the light emitting unit 8*a*.

Figure 3A:
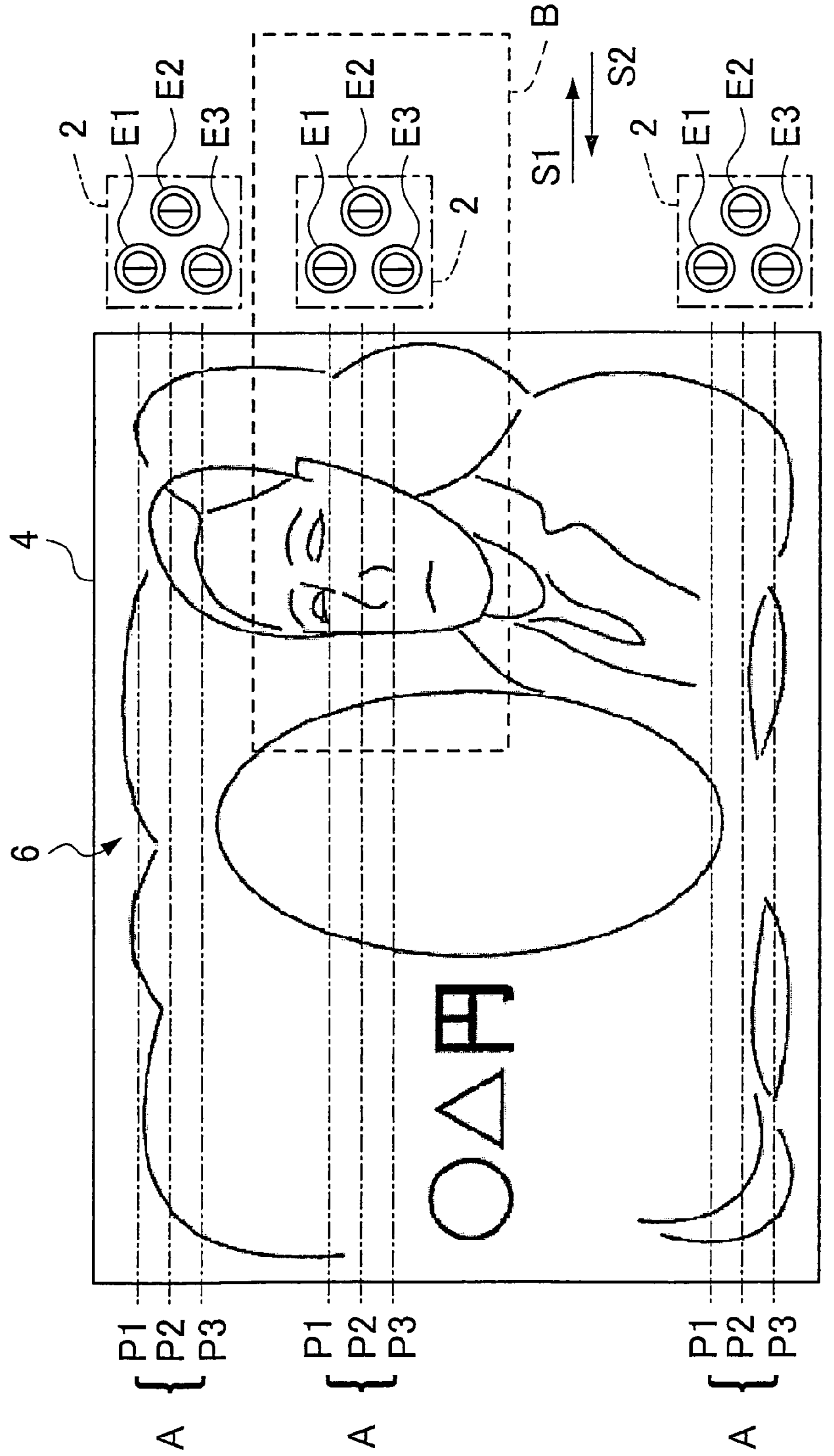
FIG. 3(*a*) is a plan view showing the process of the discrimination machine for discriminating whether the specific object is real or fake on the basis of the electric signal of the discrimination sensor.
Figure 3B:
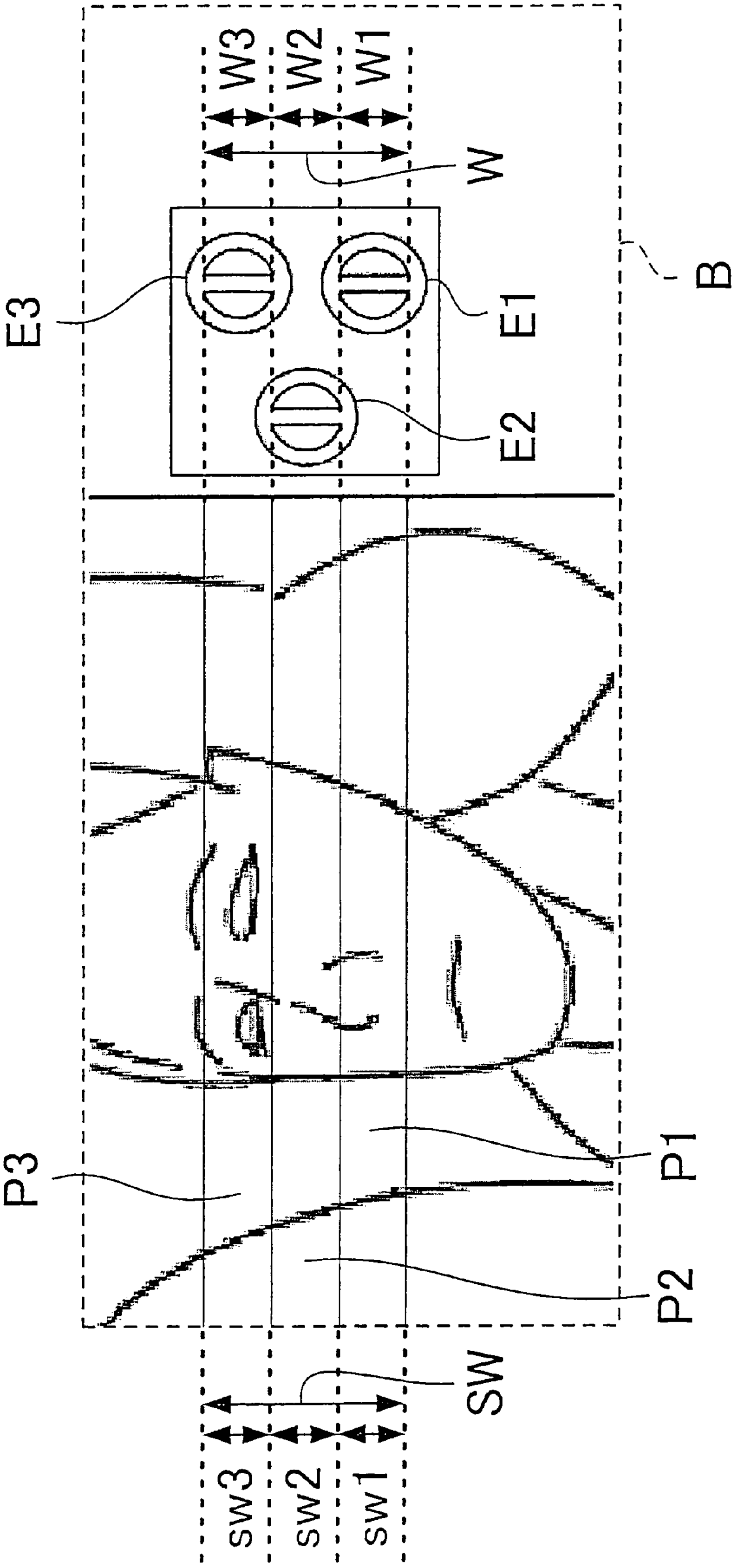
Figure 4A:
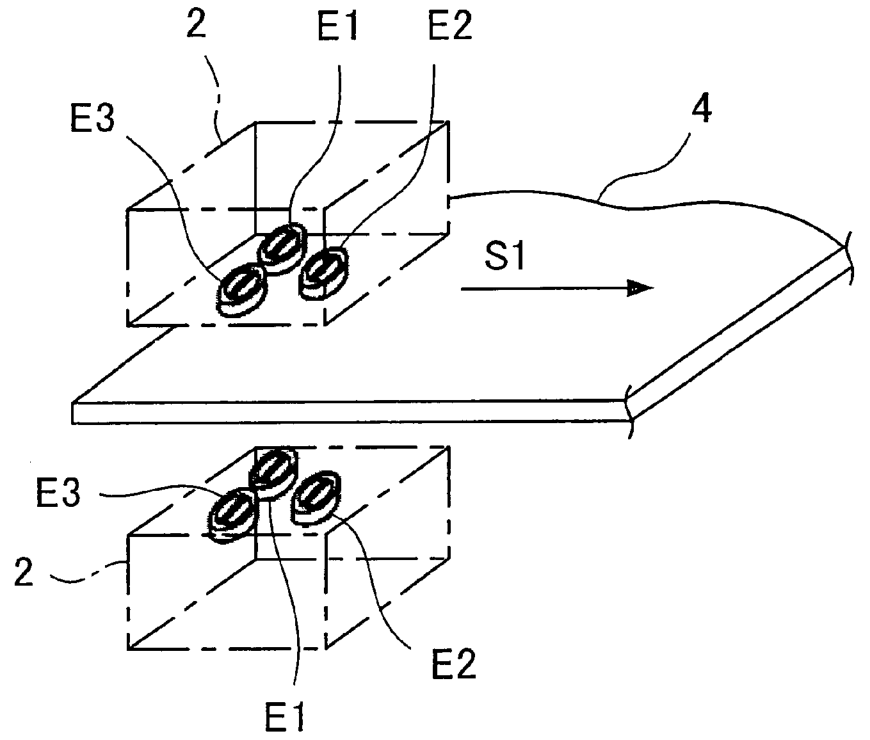
FIG. 4(*a*) is a perspective view showing the construction of the discrimination sensor for discriminating whether the specific object is real or fake on the basis of the transmitted light of the specific object.
Figure 4B:
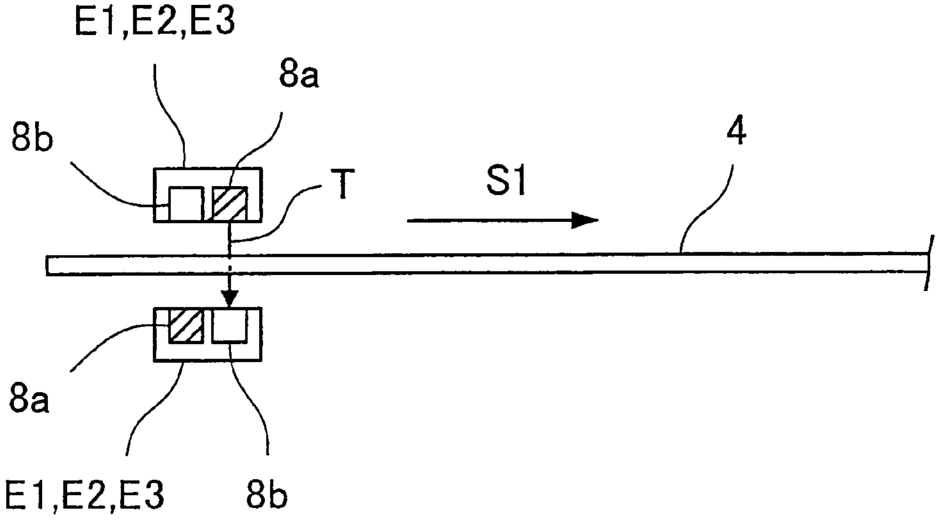

The optical devices E1, E2, and E3 is shown in FIGS. 3(*a*) and 3(*b*) as having respective sensing widths W1 to W3 substantially equal to respective widths sw1 to sw3 of the scanned segments, i.e., characteristic segments P1, P2, and P3, all of which collectively form an overall width "SW" of the scanned section "A". The optical devices E1, E2, and E3 are disposed with a predetermined interval in the transverse direction D2 and in face-to-face relationship with the respective characteristic segments P1, P2, and P3 to obtain optical information from the overall width "SW" of the scanned section "A" when the bill 4 is scanned in the scanning direction S1.

In this embodiment, each of the optical devices E1, E2, and E3 includes a light emitting unit 8*a* and a light receiving unit 8*b*. However, each of the optical devices E1, E2, and E3 may be constituted by only a light receiving unit 8*b*. Here, each of the light emitting units 8*a* may be constituted by a marketed light emitting unit such as for example a semiconductor laser diode and a light emitting diode. Each of the light receiving unit 8*b* may be constituted by a marketed light receiving unit such as for example a photo diode and a photo transistor.

Here, the term "sensing light" is intended to indicate a light which has a specific frequency, and which is produced by the semiconductor laser diode or the light emitting diode. The phrase "the light "R" generated from the bill 4 (the planar structure 6)" is intended to indicate a light "R" reflected on the bill 4 (the planar structure 6). The light "R" reflected on the bill 4 has optical information about the shape of and the position of the planar structure 6, and the optical characteristic (such as for example the change of the intensity and the frequency, and the scattering of the sensing light) depending on the density of and the type of ink (such as for example a magnetic ink).

From the above detailed description, it will be understood that the discrimination sensor 2 ensures a sufficiently wide sensing area (sum of W1, W2, and W3) with no gap in the transverse direction D2 by reason that the optical devices E1, E2, and E3 are disposed with predetermined intervals in the transverse direction D2 not only under the condition that each of the optical devices E1, E2, and E3 is constituted by both a light emitting unit 8*a* and a light receiving unit 8*b*, but also under the condition that each of the optical devices E1, E2, and E3 is constituted by only a light receiving unit 8*b*.

Here, the optical devices E1, E2, and E3 may be disposed in staggered relationship with one another in the transverse direction D2 to jointly sense the bill 4 (the planar structure 6) to obtain information indicative of the specific description.

As will be seen from, in particular, FIG. 1(*e*), each of the sensing widths W1, W2, and W3 of the optical devises E1, E2, and E3 may be intended to indicate a width capable of receiving the light reflected on the-bill 4 (planar structure 6) under the condition that the bill 4 (planar structure 6) is illuminated by the sensing light "L" emitted by the light emitting unit 8*a* of each of the optical devices E1, E2, and E3. This means that the optical devices E1, E2, and E3 are disposed with predetermined intervals along the transverse direction D2 to ensure a sufficiently wide sensing area (sum of W1, W2, and W3) for the specific object 4 in order to optically sense the characteristic segments P1, P2, and P3 with no gap.

Each of the widths W1, W2, and W3 of the optical devises E1, E2, and E3 may be intended to indicate a width capable of receiving the light reflected on the bill 4 (planar structure 6) under the condition that the bill 4 (planar structure 6) is illuminated by, for example, natural light or artificial light generated from an interior lamp, for example, a fluorescent lamp if each of the optical devices E1, E2, and E3 is constituted by only a light receiving unit 8*b*. This means that the optical devices E1, E2, and E3 are disposed with predetermined intervals along the transverse direction D2 to ensure a sufficiently wide sensing area (sum of W1, W2, and W3) for the specific object 4 in order to optically sense the characteristic segments P1, P2, and P3 with no gap.

From the above detailed description, it will be understood that the discrimination machine 1 can discriminate the specific object 4 at a relatively high accuracy and at a markedly high reliability without being affected by the deviation of the planar structure 6 by having the discrimination sensor 2 widely ensure the sensing area (sum of W1, W2, and W3).

The following description will now be directed to the case that the discrimination machine 1 is operated to have the optical devices E1, E2, and E3 optically sense the characteristic segments P1, P2, and P3 of the bill 4 (the planar structure 6). In this case, the characteristic segments P1, P2, and P3 are intended to indicate portions of the planar structure 6 which are optically sensed by the three optical devices E1, E2, and E3 when the discrimination sensor 2 is moved along the bill 4 in the scanning direction S1 as will be seen from FIGS. 3(*a*) and 3(*b*).

Here, the characteristic segments P1, P2, and P3 are in face-to-face relationship with the sensing area (sum of W1, W2, and W3) of the three optical devices E1, E2, and E3 if the planar structure 6 (characteristic segments P1, P2, and P3) printed with no deviation is optically sensed by the discrimination sensor 2. This leads to the fact that the discrimination machine provided with the discrimination sensor can discriminate the specific object at a relatively high accuracy and at a markedly high reliability without being affected by the deviation of the planar structure 6.

The following description, on the other hand, will be directed to the case that the planar structure 6 (characteristic portions P1, P2, and P3) printed with a deviation in the transverse direction is optically sensed by the discrimination sensor 2. As will be seen from in FIG. 1(*f*), the characteristic segments P1, P2, and P3 are partially in face-to-face relationship with the optical devices E1, E2, and E3 if the planar structure 6 (characteristic segments P1, P2, and P3) printed with a deviation is optically sensed by the discrimination sensor 2. In this case, the characteristic segment P1 fails to be in face-to-face relationship with each of the optical devices E1, E2, and E3. On the other hand, the characteristic segments P2 and P3 are in face-to-face relationship with the optical devices E1 and E2. This leads to the fact that the discrimination machine provided with the discrimination sensor can discriminate the specific object at a relatively high accuracy and at a markedly high reliability without being affected by the deviation of the planar structure 6.

The optical devices E1, E2, and E3 are held in face-to-face relationship with the characteristic segments P2 and P3 except for the characteristic segment P1 by reason that the optical devices E1, E2, and E3 are disposed with predetermined intervals in the transverse direction D2 to ensure a sufficiently wide sensing area for the specific object 4. This leads to the fact that the discrimination machine provided with the discrimination sensor can discriminate the specific object at a relatively high accuracy and at a markedly high reliability without being affected by the deviation of the planar structure 6 by reason that the characteristic segments P2 and P3 of the planar structure 6 are optically sensed by the optical devices E1 and E2 of the discrimination sensor 2.

As will be seen from the above description, the discrimination machine 1 provided with the discrimination sensor 2 can discriminate the specific object 4 at a relatively high accuracy and at a markedly high reliability without being affected by the deviation of the planar structure 6 on the basis of the optical information (obtained from any one of the characteristic segments P1, P2, and P3) when at least one of the characteristic segments P1, P2, and P3 is held in face-to-face relationship with the sensing area (sum of W1, W2, and W3) of the optical devices E1, E2, and E3. When, for example, the optical devices E1, E2, and E3 fail to be held in face-to-face relationship with the characteristic segments P1 and P2 of the planar structure 6 except for the characteristic segment P3 of the planar structure 6, the discrimination machine 1 provided with the discrimination sensor 2 can discriminate the specific object 4 at a relatively high accuracy and at a markedly high reliability without being affected by the deviation of the planar structure 6 by reason that the characteristic segment P3 of the planar structure 6 is optically sensed by the optical device E1 of the discrimination sensor 2.

From the above detailed description, it will be understood that the discrimination machine 1 provided with the discrimination sensor 2 can discriminate whether the bill 4 is real or fake at a relatively high accuracy and at a markedly high reliability without being affected by the deviation of the planar structure 6 (characteristic segments P1, P2, and P3) by reason that the discrimination sensor 2 comprises a plurality of optical devices E1, E2, and E3 to be disposed with a predetermined interval in a transverse direction D2 to ensure a sufficiently wide sensing area (sum of W1, W2, and W3) for the specific object 4.

When, in general, the deviation is larger than the sensing area (sum of W1, W2, and W3) of the optical devices E1, E2, and E3, that bill is easily determined as a fake object in the stage of the money circulation even if that bill is issued. In this embodiment, the description will be made by having assumption that one glance is not enough to determine whether or not the planar structure 6 (characteristic segments P1, P2, and P3) is printed with no deviation.

Consequently, the optical devices E1, E2, and E3 of the discrimination sensor 2 are constituted in consideration of the deviation of the planar structure 6 which is roughly within the range of ±2 [mm] in a lateral direction. In this case, each of the sensing widths of the optical devices E1, E2, and E3, for example, is approximately equal to 2 [mm]. The discrimination sensor 2 thus constructed can be provided in consideration of the above mentioned range of ±2 [mm] by reason that those optical devices E1, E2, and E3 are disposed with the predetermined interval in the transverse direction D2 to ensure a sufficiently wide sensing area (sum of W1, W2, and W3) with no gap.

The following description will be directed to the constitution and the operation of the discrimination machine 1 provided with the above mentioned discrimination sensor 2 to discriminate whether the bill 4 is real or fake.

The discrimination machine 1 is shown in FIGS. 1(*a*) and 1(*b*) as comprising deviation detecting means, i.e., a deviation detector 10 capable of detecting a deviation of the planar structure 6 to the surface of the bill 4 based on three electrical signals outputted from the respective optical devices E1, E2, and E3 receiving the reflected light "R" generated from the planar structure 6 of the bill 4 while the planar structure 6 is scanned along the surface of the bill 4 by the discrimination sensor 2, optical device selecting means 12 capable of selecting a specific optical device (for example, one or more optical devices) from among the three optical devices E1, E2, and E3 based on the results of the deviation of the planar structure 6 outputted by the deviation detector 10, and determining means 14 capable of determining whether or not the electric signal outputted from the specific optical device selected by the optical device selecting means 12 is within a previously stored allowable margin.

Here, the deviation detector 10, optical device selecting means 12, and deciding means 14 collectively constitute a controlling section 16.

When the reflected lights "R" generated from the characteristic segments P1, P2, and P3 of the bill 4 (planar structure 6) are received by the respective optical devices E1, E2, and E3, the light receiving units 8*b* of the optical devices E1, E2, and E3 are adapted to output respective electrical signals (for example, voltage) proportional in signal level to the light intensities of the reflected lights "R" received from the characteristic segments P1, P2, and P3 of the bill 4 (planar structure 6).

In this case, the output voltages outputted from the light receiving units 8*b* of the optical devices E1, E2, and E3 are in proportional relationship with the respective light intensities of the reflected lights "R" received from the characteristic segments P1, P2, and P3 of the bill 4 (planar structure 6). The more the light intensities of the received lights are large, the more the output voltages are increased. On the other hand, the more the light intensities of the received lights are small, the more the output voltages are decreased. The light intensities of the reflected lights "R" produced by the characteristic segments P1, P2, and P3 of the planar structure 6 are varied in response to the shapes of and the positions of the planar structure 6 (the characteristic segments P1, P2, and P3), optical characteristics (modification of each of wavelength and light intensity, and scattering) depending on the density of- and the type of ink (for example, a magnetic ink). As a result, the currents (level of electric signals [V]) outputted from the respective optical devices E1, E2, and E3 are varied in response to the respective reflected lights "R" generated from the light receiving units 8*b* of the characteristic segments P1, P2, and P3 of the planar structure 6.

The following description will be directed to the operation of the discrimination machine 1 provided with the discrimination sensor 2.

The discrimination machine 1 is firstly operated to have the discrimination sensor 2 optically sense the sample object (hundreds of real bills 4) in the pre-scan step. The electric signals are produced by the optical devices E1, E2, and E3 when each of the real bills 4 is being scanned by the discrimination machine 1. As will be seen from the above electric signals of the real bills 4, the base material of each of the real bills 4 and the planar structure 6 each of the real bill 4 are positioned with respective print deviations formed therebetween. This leads to the fact that the electric signals produced by the optical devices E1, E2, and E3 are then stored as sample data in the ROM 18. Here, the above mentioned sample data are obtained from the electric signals produced by each of the discrimination sensors 2 (the light receiving unit 8*b* of the optical devices E1, E2, and E3) when the sample object is sensed from its one end to the other end. The maximum and minimum lines M1 and M2 obtained from the sample data of the characteristic segments P1, P2, and P3 define respective allowable margins.

The determination is then made by the determining means 14 on whether or not the fluctuations of the electric signals X1, X2, and X3 produced by the optical devices E1, E2, and E3 are within the respective allowable margins. The discrimination machine 1 is then operated to discriminate whether the bill 4 is real or fake on the basis of the determination of the determining means 14.

The following description will be directed to the case that the planar structure 6 (characteristic segments P1, P2, and P3) printed with no deviation is scanned by the discrimination machine 1. As will be seen from FIG. 1(*e*), the characteristic segments P1, P2, and P3 are in face-to-face relationship with the optical devices E1, E2, and E3 if the planar structure 6 is printed with no deviation. This leads to the fact that the fluctuations of the electric signals X1, X2, and X3 (broken lines shown in FIGS. 2(*a*) to 2(*c*)) produced by the optical devices E1, E2, and E3 are entirely within the respective allowable margins defined on the basis of the maximum and minimum lines M1 and M2 of the stored sample data if the scanned bill 4 is real.

The following description, on the other hand, will be directed to the case that the planar structure 6 (characteristic segments P1, P2, and P3) printed with a deviation is scanned by the discrimination machine 1. As will be seen from in FIG. 1(*f*), the characteristic segments P1, P2, and P3 are partially in face-to-face relationship with the optical devices E1, E2, and E3 if the planar structure 6 is printed with the deviation. In this case, the characteristic segment P1 fails to be in face-to-face relationship with each of the optical devices E1, E2, and E3. On the other hand, the characteristic segments P2 and P3 are optically sensed by the optical devices E1 and E2. Additionally the segment P4, which does not carry the characteristics, is optically sensed by the optical device E3.

Figure 2A:
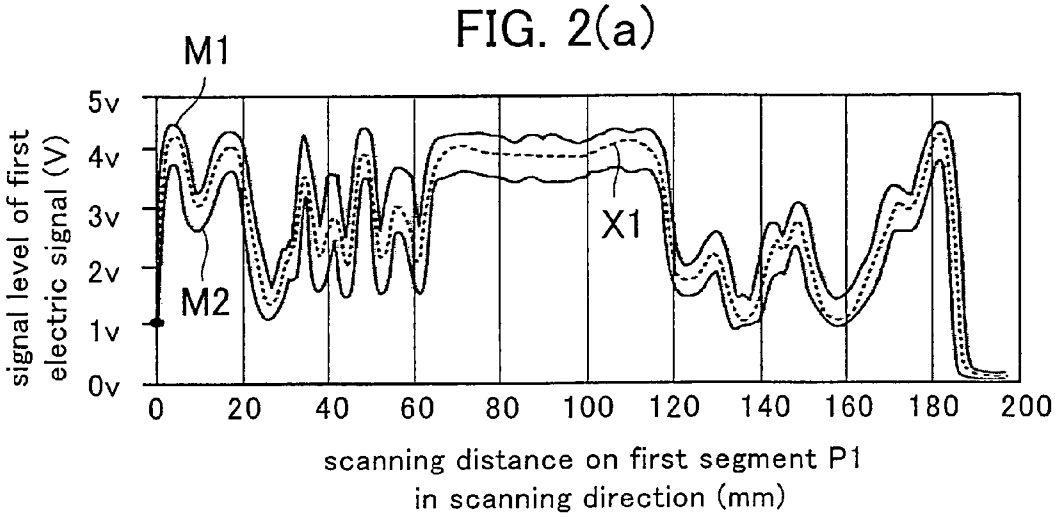
FIG. 2(*a*) is a graph showing the allowable margin of the sample data obtained from the characteristic segment P1.
Figure 2B:
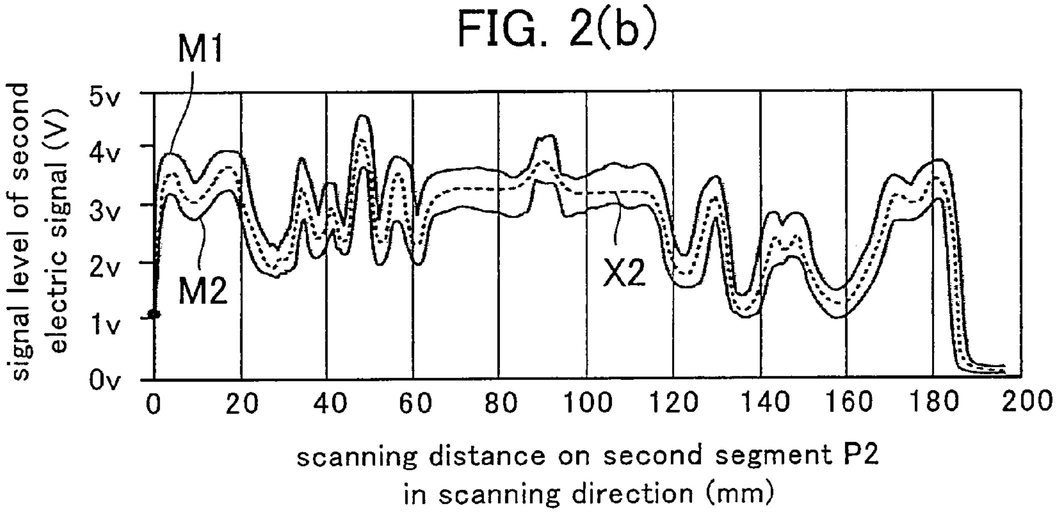
Figure 2C:
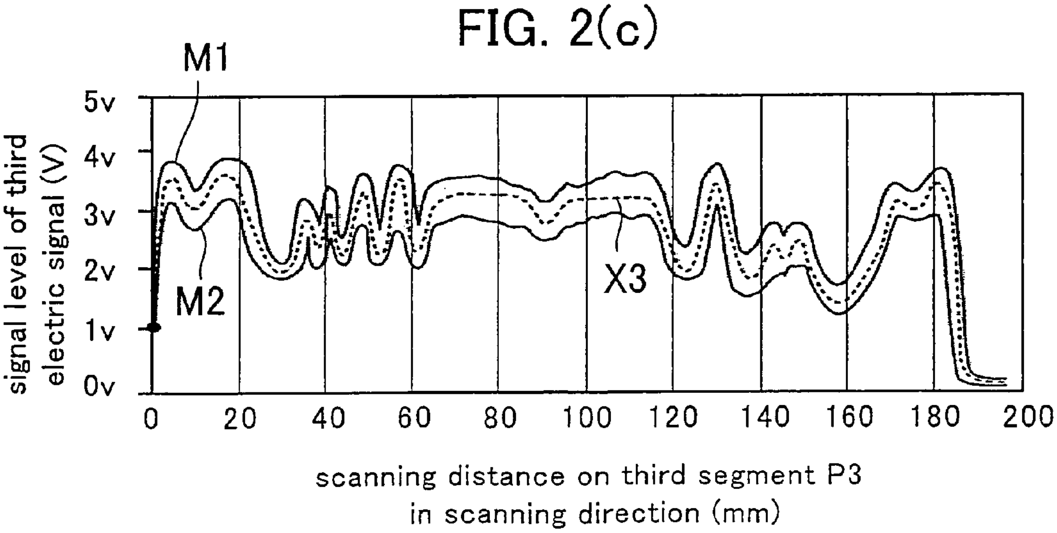

The determination is then made by the determining means 14 on whether or not the fluctuation of the electric signal X1 produced by the optical device E1 is within the allowable margin of the sample data shown in FIG. 2(*a*), whether or not the fluctuation of the electric signal X2 produced by the optical device E2 is within the allowable margin of the sample data shown in FIG. 2(*b*), and whether or not the fluctuation of the electric signal X3 produced by the optical device E3 is within the allowable margin of the sample data shown in FIG. 2(*c*). However, the fluctuations of the electric signals X1, X2, and X3 produced by the optical devices E1, E2, and E3 are not within the respective allowable margins of the sample data if the characteristic segments P1, P2, and P3 are not partially in face-to-face relationship with the optical devices E1, E2, and E3 as will be seen from in FIG. 1(*f*).

The deviation detector 10 of the discrimination machine 1 (the controlling section 16) is then operated to detect the deviation of the planar structure 6 to the base material on the basis of the electric signals X1, X2, and X3 produced by the optical devices E1, E2, and E3. In particular, the deviation detector 10 of the controlling section 16 is operated to compare each of the electric signals produced by the optical devices E1, E2, and E3 (the light receiving units 8*b*) and the sample data (FIGS. 2(*a*) to 2(*c*)) previously stored in the ROM 18. When, for example, the determination is made in this comparing step that the fluctuation of each of the electric signals X1 and X3 produced by the optical device E1 and E3 is not similar to any one of the sample data stored in the ROM 18, the fluctuation of the electric signal X1 produced by the optical device E1 being similar to the sample data shown in FIG. 2(*b*), and the fluctuation of the electric signal X2 produced by the optical device E2 being similar to the sample data stored shown in FIG. 2(*c*), the deviation of the planar structure 6 is detected in the transverse direction D2 by the deviation detector 10. The determination of the deviation detector 10 is then received by the optical device selecting means 12.

The optical device selecting means 12 is then operated to select one or more specific optical devices from among the optical devices E1, E2, and E3 on the basis of the determination of the deviation detector 10. When, for example, the decision is made that the electric signal X1 produced by the optical device E1 (light receiving unit 8*b*) is similar to the sample data shown in FIG. 2(*b*), the electric signal X2 produced by the optical device E2 (light receiving unit 8*b*) being similar to the sample data shown in FIG. 2(*c*), and the electric signal X3 produced by the optical device E3 (light receiving unit 8*b*) is not similar to any one of the sample data stored in the ROM 18, the optical devices E1 and E2 are selected as specific optical devices by the optical device selecting means 12. The decision of the optical device selecting means 12 is then outputted to the determining means 14.

As will be seen from FIGS. 2(*b*) and 2(*c*), the determination is then made by the determining means 14 on whether or not the electric signals X1 and X2 produced by the light receiving units 8*b* of the optical devices E1 and E2 are within the respective allowable margins of the sample data stored in ROM 18. In particular, the determination is made in this step that the fluctuation of the electric signal X1 produced by the light receiving unit 8*b* of the optical device E1 is within the allowable margin of the sample data shown in FIG. 2(*b*), and that the fluctuation of the electric signal X2 produced by the light receiving unit 8*b* of the optical device E2 is within the allowable margin of the sample data shown in FIG. 2(*c*). As will be seen from FIGS. 3(*a*) and 3(*b*), the electric signals X1, X2, and X3 are simultaneously outputted from each of the discrimination sensors 2, and simultaneously processed by the discrimination machine 1.

If the bill 4 is real, the broken lines indicative of the electric signals X1 and X2 produced by the light receiving units 8*b* of the optical devices E1 and E2 are fluctuated between the minimum line M1 and maximum line M2 as will be seen from FIGS. 2(*b*) and 2(*c*). When, on the other hand, that bill 4 is fake, the electric signals X1 and X2 of the optical devices E1 and E2 fail to be within the respective allowable margins of the sample data shown in FIGS. 2(*b*) and 2(*c*) if the bill 4 is fake.

From the above detailed description, it will be understood that the discrimination machine 1 can discriminate whether the bill 4 is real or fake at a relatively high accuracy and at a markedly high reliability on the basis of the electric signals X1 and X2 of the optical devices E1 and E2 selected by the optical device selecting means 12 without being affected by the print deviation of the planar structure 6.

In general, the intensity of the light reflected by the newly-printed bill 4 is larger than the intensity of the light reflected by the faded bill 4. However, the difference between the minimum and maximum values of the light reflected by the newly-printed bill 4 is similar to the difference between the minimum and maximum values of the light reflected by the faded bill 4. This means that the allowable margin of the sample data can be defined by the previously stored maximum and minimum lines M1 and M2 without depending on whether the bill 4 is newly-printed or faded. This leads to the fact that the deviation can be determined at relatively high accuracy on the basis of the previously stored maximum and minimum lines M1 and M2, and the electric signals X1, X2, and X3 produced by the optical devices E1, E2, and E3.

When the characteristic segment P3 is optically sensed by the optical device E1 under the condition that the characteristic segments P1 and P2 of the planar structure 6 is out of the scanning area of the optical devices E1, E2, and E3, and that the characteristic segment P3 of the planar structure 6 is within the scanning area of the optical devices E1, E2, and E3, the determination is made on whether or not the electric signal X1 produced by the optical device E1 is within the allowable margin of the sample data (see FIG. 2(*c*)).

When, on the other hand, the characteristic segment P1 is optically sensed by the optical device E3 under the condition that the characteristic segments P2 and P3 of the planar structure 6 is out of the scanning area of the optical devices E1, E2, and E3, and that the characteristic segment P1 of the planar structure 6 is within the scanning area of the optical devices E1, E2, and E3, the determination is made on whether or not the electric signal XI produced by the optical device E3 is within the allowable margin of the sample data (see FIG. 2(*a*)).

In the above mentioned discrimination sensor 2, the optical devices E1, E2, and E3 can be respectively constituted by marketed optical devices to easily ensure a sufficiently wide sensing area (sum of W1, W2, and W3) in order to widely sense of the specific object 4 in the scanning direction S1. This leads to the fact that the discrimination sensor 2 can be simple in construction and produced at a relatively low cost in comparison with the conventional discrimination sensor 2.

In the above mentioned embodiment, the discrimination sensor 2 are adapted to optically sense the specific object 4 through the reflected light "R". However, the discrimination sensor 2 may be adapted to optically sense the specific object 4 through the transmitted light "T" as will be seen from FIGS. 4(*a*) and 4(*b*). In this case, the discrimination machine 1 comprises a pair of discrimination sensors 2 to be disposed in face-to-face relationship with each other across the specific object 4. The light emitting unit 8*a* of one of the pair of the discrimination sensors 2 is adapted to emit a specific light "L" to the specific object 4 having optical transparency under the condition that the light receiving unit 8*b* of one of the pair of the discrimination sensors 2 is controlled to fail to receive a light from the-specific object 4, while the light receiving unit 8*b* of the other of the pair of the discrimination sensors 2 is adapted to receive the sensing light "T" transmitted through the specific object 4 under the condition that the light emitting unit 8*a* of the other of the pair of the discrimination sensors 2 is controlled to fail to emit a light to the specific object 4.

In this embodiment, the wave length and the emission timing of the sensing light "L" to be emitted by the light emitting unit 8*a* of each of the optical devices E1, E2, and E3 of the discrimination sensor 2 are not described in detail. However, each of the wave length and the emission timing of the sensing light "L" to be emitted by the light emitting unit 8*a* of each of the optical devices E1, E2, and E3 of the discrimination sensor 2 can be configured on the basis of the specific object 4 to be discriminated. For example, two more different sensing lights "L" (visible light and infrared light) can be controlled by the controlling section 16 to be separately emitted by the light emitting unit 8*a* of each of the optical devices E1, E2, and E3 of the discrimination sensor 2. In this case, it is preferable that the wavelength of one of the above mentioned two different sensing lights "L" is within the range of 700 to 1500 nanometer (as an infrared light), the wavelength of the other of the sensing lights "L" is within the range of 380 to 700 nanometer (as a visible light).

In the above mentioned embodiment, the specific object 4 is exemplified by a bill 4. However, the specific object may be exemplified by a semiconductor product such as for example an integrated circuit chip having a circuit pattern printed thereon. For more details, the base material and the planar structure may be replaced by a semiconductor material and a circuit pattern printed on the semiconductor material, respectively. This means that the discrimination machine according to the present invention can discriminate whether the complicated and minute circuit pattern of the integrated circuit chip is good and flawed at a relatively high accuracy. This leads to the fact that the discrimination machine thus constructed previously mentioned can discriminate the integrated circuit to enhance a process yield of mass-produced semiconductor products.

Additionally, the planar structure may be constituted by one or more complicated and minute grooves (or pits of optical memory medium) formed on the surface of the specific object.

In the discrimination process of the above mentioned embodiment, the two electric signals respectively produced by the optical devices E1 and E2 are selected by the optical device selecting means 12 on the basis of the deviation of the printed planar structure of the bill 4 detected by the deviation detector 10. However, the discrimination machine according the present invention may discriminate the specific object on the basis of all of the electric signals produced by the optical devices without detecting the deviation of the printed planar structure.

For example, the discrimination machine is firstly operated to calculate (as a mean value of the sample object) the mean value of the electric signals produced by the optical devices to store the mean value in the ROM in the pre-scan step. The discrimination machine is then operated to calculate the mean value of the electric signals produced by the optical devices to determine whether or not the mean value is within the allowable margin defined from the stored mean value in the discrimination step. From the above mentioned example, it will be understood that the optical devices can be easily operated to collectively serve as one optical sensor having a sufficiently wide sensing width to enhance the convenience of the discrimination machine.

The discrimination machine according to the present invention can discriminate whether not only the bill but also, for example, a prepaid card and securities is real or fake. Additionally, the discrimination machine according to the present invention is applicable to the determination machine for determining whether or not the precision of the complicated circuit pattern formed on the semiconductor wafer is good in the technical field on the semiconductor wafer in order to enhance the process yield of the semiconductor products.

As will be understood from the foregoing description, the discrimination machine provided with the discrimination sensor can discriminate the specific object at a relatively high accuracy and at a markedly high reliability by reason that the discrimination sensor comprises a plurality of optical devices having respective sensing widths which are substantially equal to the respective widths of the characteristic segments of the specific object, the optical devices being disposed with the predetermined interval in the transverse direction to ensure a sufficiently wide sensing area for the specific object in order to jointly sense the scanned section to obtain optical information from the scanned section. The discrimination sensor and the discrimination machine can be simple, in construction and produced at a relatively low cost.

While the present invention has been described with respect to the preferred embodiments, various modifications and adaptations thereof will now be apparent to those skilled in the art as far as such modifications and adaptations fall within the scope of the appended claims.

What is claimed is:

1. A discrimination sensor for mounting on a machine for scanning a specific object, said specific object having a surface with a planar structure, said specific object having a scanned section, said discrimination sensor comprising:

a plurality of optical devices having respective sensing widths and arranged to output respective electrical signals, wherein said scanned section has a plurality of scanned segments divided in a transverse direction and extending in a longitudinal direction, perpendicular to said transverse direction, said scanned segments having respective widths substantially equal to said respective sensing widths of said optical devices, said widths of said scanned segments collectively forming an overall width of said scanned section, said optical devices are disposed with a predetermined interval in said transverse direction to obtain optical information from said overall width of said scanned section when said specific object is scanned in a scanning direction perpendicular to said transverse direction, and said machine detects deviation of said planar structure from said surface of said specific object by determining whether said electrical signals output are within allowable margins of sample data stored in said machine.

2. The discrimination sensor as set forth in claim 1, wherein each of said optical devices comprises a light emitting unit for emitting a predetermined sensing light onto said scanned section of said specific object, and a light detecting unit for detecting said sensing light from said scanned section of said specific object when said sensing light is emitted by said light emitting unit.

3. The discrimination sensor as set forth in claim 1, wherein said optical devices are in face-to-face relationship with said respective scanned segments and in staggered relationship with one another in said transverse direction.

4. A discrimination machine for scanning a specific object having a surface with a planar structure to discriminate said specific object, said discrimination machine comprising:

a discrimination sensor including a plurality of optical devices located to detect light generated from said planar structure of said specific object, said optical devices being disposed with a predetermined interval in a transverse direction, perpendicular to a scanning direction in which said specific object is scanned, to ensure a sufficiently wide sensing area for said specific object;

deviation detecting means for detecting deviation of said planar structure from said surface of said specific object, based on electrical signals outputted from said respective optical devices detecting said light generated from said planar structure of said specific object while said discrimination sensor is scanning said planar structure along said surface of said specific object;

optical device selecting means for selecting a specific optical device, from among said optical devices, based on said deviation of said planar structure indicated by said electrical signals output by said deviation detecting means; and determining means for determining whether said electric signal output by said specific optical device selected by said optical device selecting means is within a previously stored allowable margin.

5. The discrimination machine as set forth in claim 4, wherein each of said optical devices comprises a light emitting unit for emitting a predetermined sensing light to said planar structure of said specific object, and a light detecting unit for detecting said sensing light from said planar structure of said specific object when said sensing light is emitted by said light emitting unit.

6. The discrimination machine as set forth in claim 4, wherein said optical devices are disposed in said transverse direction with no gap between said optical devices.

7. A discrimination machine for scanning a specific object having a surface with a planar structure to discriminate said specific object, said specific object having at least one scanned section, said discrimination machine comprising:

at least one discrimination sensor for detecting light generated from said planar structure of said specific object by optically sensing said scanned section of said specific object, said scanned section having a plurality of scanned segments divided in a transverse direction, said discrimination sensor including a plurality of optical devices having respective sensing widths substantially equal to respective widths of said scanned segments, all of said optical devices collectively forming an overall width of said scanned section, and said optical devices being disposed with a predetermined interval in said transverse direction to obtain optical information from said overall width of said scanned section when said specific object is scanned in a scanning direction perpendicular to said transverse direction;

deviation detecting means for detecting deviation of said planar structure from said surface of said specific object, based on electrical signals outputted from said respective optical devices detecting said light generated from said planar structure of said specific object while said discrimination sensor is scanning said planar structure along said surface of said specific object;

optical device selecting means for selecting a specific optical device, from among said optical devices, based on said deviation of said planar structure indicated by said electrical signals output by said deviation detecting means; and determining means for determining whether said electric signal output by said specific optical device selected by said optical device selecting means is within a previously stored allowable margin.

8. The discrimination machine as set forth in claim 7, wherein each of said optical devices comprises a light emitting unit for emitting a predetermined sensing light to said scanned section of said specific object, and a light detecting unit for detecting said sensing light from said scanned section of said specific object when said sensing light is emitted by said light emitting unit.

9. The discrimination machine as set forth in claim 7, wherein said optical devices are in face-to-face relationship with said respective scanned segments and in staggered relationship with one another in said transverse direction.

* * * * *